(12) United States Patent
Shih et al.

(10) Patent No.: US 6,765,416 B2
(45) Date of Patent: Jul. 20, 2004

(54) DEVICE FOR RECOGNIZING POWER SOURCES AND ASSOCIATED METHOD

(75) Inventors: Chi-Wei Shih, Shindian (TW); Ying-Lang Chuang, Kaohsiung (TW)

(73) Assignee: Via Technologies, Inc., Taipei (TW)

( * ) Notice: Subject to any disclaimer, the term of this patent is extended or adjusted under 35 U.S.C. 154(b) by 19 days.

(21) Appl. No.: 10/108,862

(22) Filed: Mar. 29, 2002

(65) Prior Publication Data

US 2002/0140411 A1 Oct. 3, 2002

(30) Foreign Application Priority Data

Mar. 30, 2001 (TW) .......................................... 90107635

(51) Int. Cl.[7] ................................................ H03K 5/00
(52) U.S. Cl. ........................ 327/1; 327/142; 323/299
(58) Field of Search ............................... 327/142, 143, 327/198, 1; 323/299, 312

(56) References Cited

U.S. PATENT DOCUMENTS 5,523,709 A * 6/1996 Phillips et al. .............. 327/143
6,310,497 B1 * 10/2001 Strauss ....................... 327/143
6,335,894 B1 * 1/2002 Iwata et al. ................. 365/226

* cited by examiner

Primary Examiner—Linh M. Nguyen
(74) Attorney, Agent, or Firm—Rabin & Berdo, P.C.

(57) ABSTRACT

A device for recognizing power sources and associated method are provided. The device for recognizing power sources comprises two voltage-dividing devices. Each of the voltage-dividing devices is coupled to receive native power, and outputs the part of the voltage of the native power. According to the method, an output end of one voltage-dividing device is coupled to a signal end of the controller, and an output end of the other voltage-dividing device is coupled to the other signal end of the controller. When the native power exists, both of the above-mentioned signal ends are in a high voltage level. On the other hand, when native power does not exists, both of the above-mentioned signal ends are at a low voltage level. The power source of the hardware device and the value of the native power can be exactly recognized according to the voltage levels of both signal ends.

18 Claims, 3 Drawing Sheets

US 6,765,416 B2

DEVICE FOR RECOGNIZING POWER SOURCES AND ASSOCIATED METHOD

This application incorporates by reference Taiwanese application Serial No. 090107635, Filed on Mar. 30, 2001.

BACKGROUND OF THE INVENTION

1. Field of the Invention

This invention relates to a device for detecting power sources, and more particularly, to a device for detecting and recognizing power sources of a hardware device.

2. Description of the Related Art

Nowadays, along with developments in the computer industry, the Internet has also spread to every corner of the world with amazing speed and ushered in the real coming of the information era. In the contemporary information environment, there are various peripherals needing to be linked together. Both communication between host computers and their peripheral devices, and the information exchange between consuming products and information products, require communication interfaces in order to achieve correct information flow among each facility. According to traditional methods, the most frequently used communication interface is the RS-232 or parallel interface, and so on. But both have the disadvantages of low throughput and inconvenient linkage and so on. In order to meet the demand of information flow in the E world, further advanced communication interfaces must be developed to meet this demand. After considering many aspects, the USB and IEEE-1394 communication interfaces were then invented. The RS-232 communication interface and the parallel communication interface are gradually stepping into history because both USB and IEEE-1394 have the advantages of hot-plugging and a high transfer rate. In the future, USB and IEEE-1394 will replace the older communication interfaces and become the future stars on the stage of information.

As it is known that the communication interfaces, USB and IEEE-1394, both can be linked to many hardware devices. According to present technology, a USB interface alone can at most link 127 hardware devices, and an IEEE-1394 interface alone can at most link 63 hardware devices. Please refer to FIG. 1, which shows the coupling relationship between a PC and a hardware device. It should be noted that not every hardware device is accompanied with its own native power. Therefore, the USB and IEEE-1394 communication interfaces need to be equipped with cable power in order to provide power for some hardware devices without native power, such as a keyboard, a mouse, and so on. Those belonging to hardware devices without native power must rely on cable power to maintain their normal function. However, digital cameras belong to hardware devices with native power, so their own power supply can be used. It is not necessary for them to use the cable power of a communication interface.

But because of some factors, for example, for convenient usage, which causes the situation that some hardware device could not supply power for itself, then the hardware device needs to reply on the other linked devices on the network or the mainframe to supply power. In order to make power management more efficient, it needs an electric circuit to tell that every hardware device is at present using it's own native power or the cable power from other connected devices. According to present methods, this electric circuit for detecting power sources is almost made up of a simple voltage check and a logical electric circuit by using several transistors and diodes to carry out the function. Please refer to FIG. 2, which illustrates a structure of a traditional electric circuit. FIG. 2 shows an electric circuit for recognizing power sources connected to a controller in traditional hardware devices. The electric circuit for recognizing power sources consists of several diodes, transistors, and resistors. And it comes with a native power Vnp as an input signal of the electric circuit. The coupling relationship of each device in the electric circuit is illustrated in FIG. 2. It should be noted that this electric circuit for recognizing power sources is constructed outside a controller 230. And the specification of the controller can conform the interfaces that match the specifications of USB, IEEE1394, and so on. If the hardware device is using its native power Vnp, the voltage of the collector of the transistor Q1 should be logic 0, and the voltage of the collector of the transistor Q2 should be logic 1. The voltage of the collector of the transistor Q1 is fed into a signal end PC0 of the controller 230, and the voltage of the collector of the transistor Q2 is fed into a signal end PC2 of the controller 230, the controller 230 can tell whether the power source, which this hardware device is using, is the native power Vnp according to the logic situations of the signal end PC0 and the signal end PC2.

From the other viewpoint, if the hardware device is not using the native power Vnp, the voltage of the collector of the transistor Q1 should be logic 1, and the voltage of the collector of the transistor Q2 should be logic 0. Therefore, the signal end PC0 of the controller 230 should be logic 1, and the signal end PC2 should be logic 0. According to the logic situations of the signal end PC0 and the signal end PC2 in the controller 230, it is known that the power source used by this hardware device at present is the external power, such as cable power. Therefore, by detecting the logic situations of the signal end PC0 and the signal end PC2, the controller 230 can tell whether the power source, which this hardware device is using, is the external power or the native power.

According to the above description, the power source of the hardware device can be exactly known by the installation of the recognizing electric circuit. However, it should be noted that the recognizing electric circuit is installed outside the controller, that is, the dimension of the circuit board increases due to the insertion of the recognizing electric circuit. This method seems not very economical under the requirements of reducing product volume and the cost.

Furthermore, the voltage of native power used by a hardware device usually ranges from 8V to 40V, typically 12V. According to the above-mentioned method, the present power source is recognized by the logic status of the signal end PC0 and the signal end PC2 by the controller 230. As the voltage of the native power goes higher from the threshold voltage, the values of signal PC0 and PC1 remain 0 and 1. Therefore, the other device linked to this hardware device can not exactly recognize what the magnitude of the native power of this hardware device is according to the logic status of the signal end PC0 and the signal end PC2. It therefore increases difficulty for power management.

The traditional device for recognizing power sources as the above-mentioned has the following disadvantages at least:

(1) The dimension of an electric circuit board will be increased by the installation of the recognizing electric circuit. This cannot meet the principle of being light, thin, tiny, and cute.

(2) The magnitude of the native power of the hardware device cannot be recognized according to the logic status of the signal end PC0 and the signal end PC2. It therefore increases difficulty for power management.

SUMMARY OF THE INVENTION

It is therefore an object of the invention to provide a device for recognizing power sources to reduce the usage dimension of an electric circuit board.

It is another object of the invention to provide a device for recognizing power sources, which can exactly recognize the value of a native power according to the situations of signal ends of a controller and can simplify the complexity of power management.

The invention achieves the above-identified objects by providing a device and method for recognizing power sources. This device is briefly described as following:

The device for recognizing power sources can be installed in a controller of a hardware device. It comprises two voltage dividers. The voltage-dividing device comprises two resistors, which are connected in series. And both voltage-dividing devices are coupled to the native power and output the partial voltage. It can be implemented by being coupled the output end of a voltage-dividing device to the signal end of a controller, and coupled the output end of another voltage-dividing device to another signal end of the controller. When the native power exists, both of the above-mentioned signal ends are in a high voltage level. When there is no native power, both of the above-mentioned signal ends are in a low voltage level. Because both voltage levels of the signal ends are the partial voltage of the native power, the power source of the hardware device and the value of the native power can be exactly recognized according to the voltage levels of both signal ends. Briefly speaking, the method for recognizing power sources according to this invention uses voltage dividers to feed the partial voltage of the native power into the controller. While the native power exists, the fed signals of the controller are in a high voltage level. When the native power does not exist, the fed signals of the controller are in a low voltage level. Therefore, according to the high or low level of the voltage fed from the native power, the controller can exactly recognize the power source of the hardware device and the value of the native power.

BRIEF DESCRIPTION OF THE DRAWINGS

Objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
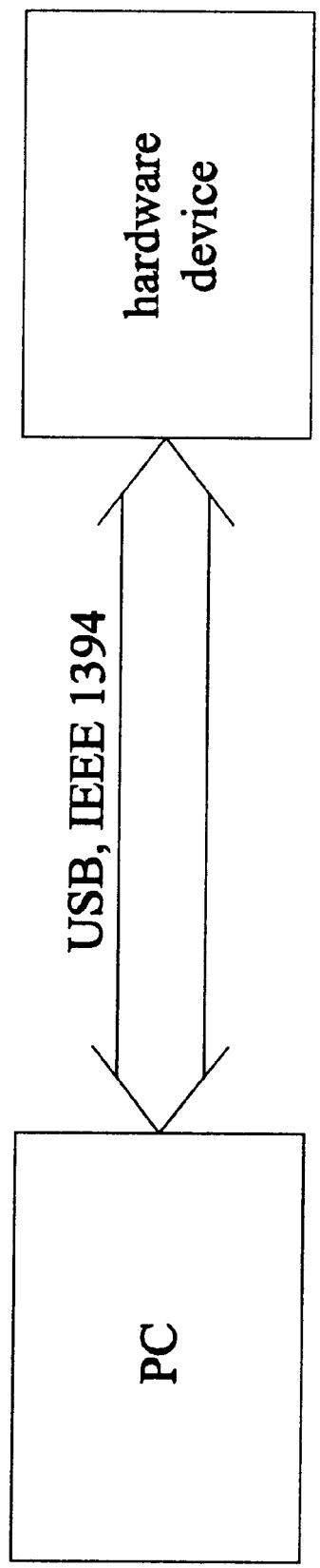
FIG. 1 is an illustration of coupling relationship between a PC and a hardware device.
Figure 2:
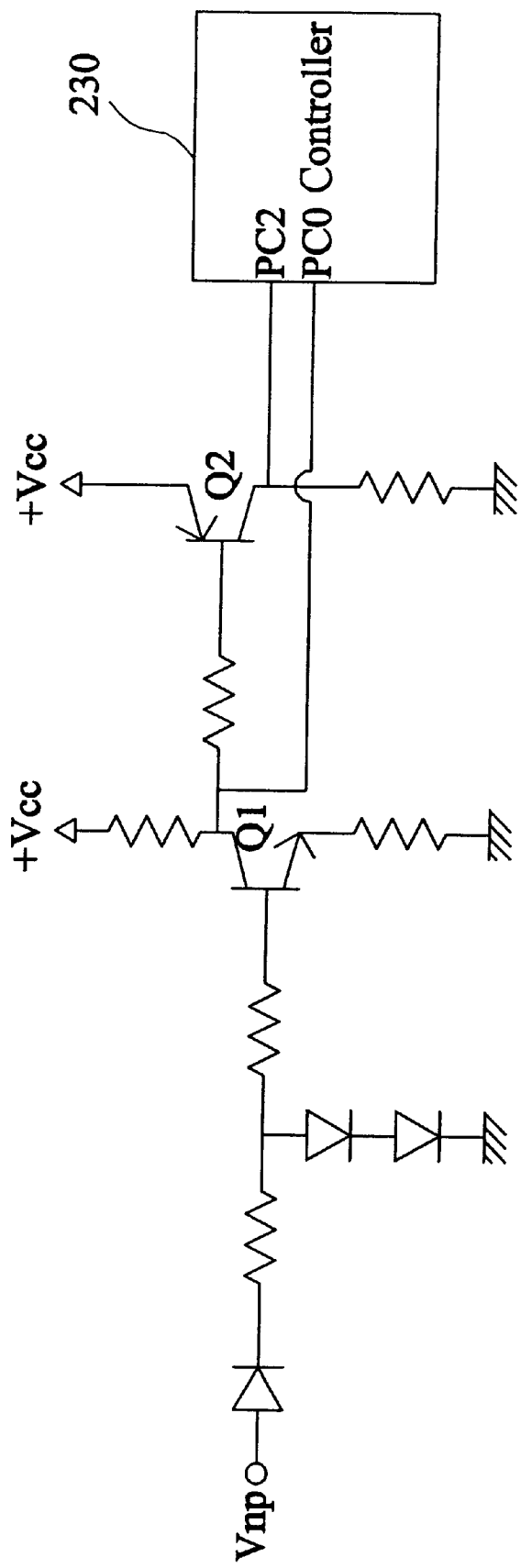
FIG. 2 shows an electric circuit for recognizing power sources and a controller in traditional hardware devices according to the prior art.
Figure 3:
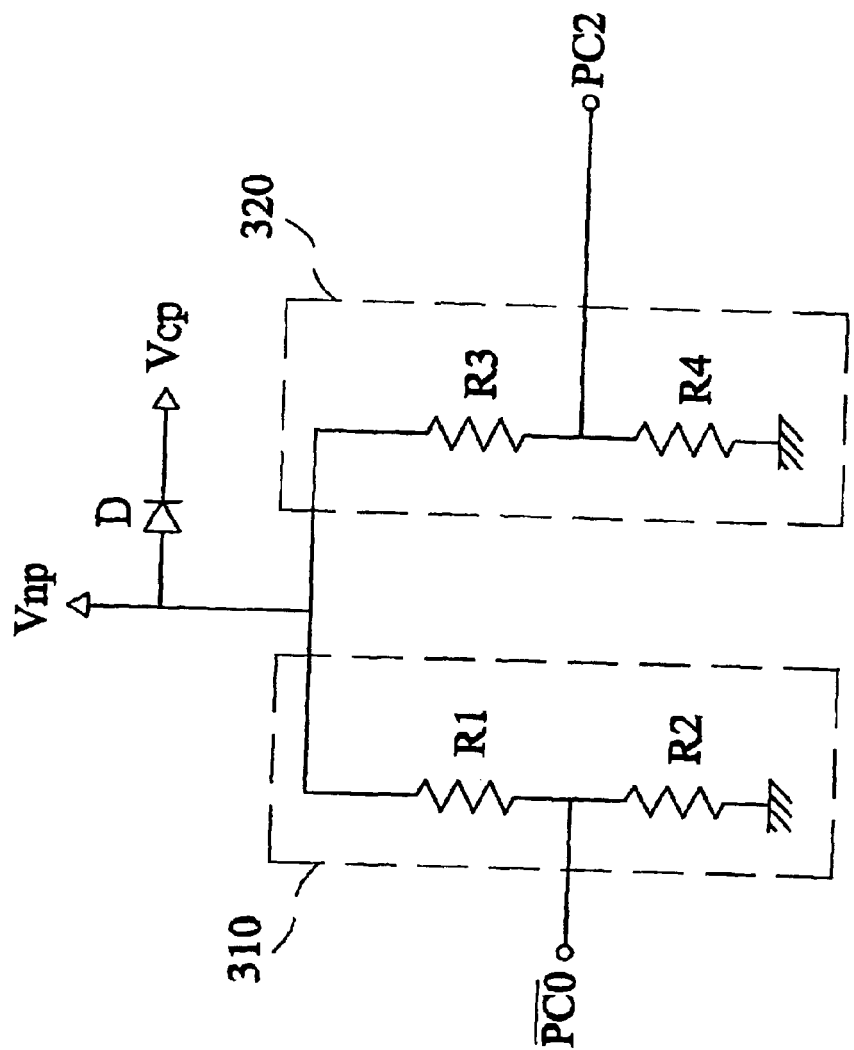
FIG. 3 illustrates a device for recognizing power sources of the according to one preferred embodiment of the invention.

Please refer to FIG. 3, which shows a device for recognizing power sources according to one preferred embodiment of the invention. The device for recognizing power sources comprises a voltage-dividing device 310 and a voltage-dividing device 320. Both can be installed in a controller, for example, the controller 230 in FIG. 2. It should be noted that the voltage-dividing device 310 and the voltage-dividing device 320 are both coupled to the native power Vnp. In addition, the output end of the voltage-dividing device 310 is coupled to a signal end PC0 of the controller, and the output end of the voltage-dividing device 320 is coupled to a signal end PC2 of the controller. When the native power exists, because the voltage-dividing device 310 comprises a resistor R1 and a resistor R2 which are connected in series, the output voltage of the voltage-dividing device 310 is Vnp×R2/(R1+R2). This voltage is then the voltage level of the signal end PC0. By the same theory, when the native power Vnp exists, because the voltage-dividing device 320 comprises two resistors R3 and R4 in series connection, the output voltage of the voltage-dividing device 320 is Vnp×R4/(R3+R4). This voltage is then the voltage level of the signal end PC2. When designing, if we set R1=R3, and R2=R4, the voltage levels of the signal end PC0 and the signal end PC2 should be the same. Moreover, if the varying range of the native power Vnp is V1~V2, (for example V1=40V, V2=8V), the maximum input voltage of the controller is Vm, and the input threshold voltage is Vt. In order to meet the design requirement of input voltage of the controller, there are 2 formulas as following:

$$Vm = V1 \times R2/(R1+R2) \quad (1)$$

$$Vt = V2 \times R2/(R1+R2) \quad (2)$$

Wherein, the values of voltage V1 and the voltage V2 are known. That is, for example, the voltage V1 is 40V, and the voltage V2 is 8V. And the maximum input voltage Vm, which is decided during manufacturing process, is also controlled by the designer. Therefore, the ratio of R2/(R1+R2) can be induced by the first formula (1). Next, the value of the input threshold voltage Vt can be known by forwarding the value of the ratio of R2/(R1+R2) into the second formula (2). When V1>Vnp>V2, we can get the expected voltage values of the signal end PC0 and the signal end PC2. Persons skilled in the art can know the value of the input threshold voltage Vt, and control Vt by the design of the pads of the chip for example. We can use several resistors to achieve the object of recognizing power sources by selecting suitable values of R1 and R2 to satisfy the ratio value of R2/(R1+R2) as expected. Furthermore, since the signal ends for recognizing power sources are the signal ends PC0 and PC2 of the controller, it is therefore, when the native power Vnp exists, the signal end PC0 should be in a low voltage level (because the signal end PC0 is in a high voltage level), and the signal end PC2 should be in a high voltage level. Therefore, it is known that the present power source of the hardware device is the native power Vnp according to the above-mentioned voltage levels of the signal end PC0 and the signal end PC2.

Additionally, in view of FIG. 3, the voltage-dividing device 310 and 320 are capable of being coupled to the cable power Vcp via the diode D at its negative end. As a result, when the native power Vnp exists, the signal PC2 is in high voltage level and the signal PC0 is in low voltage level. And when only the cable power Vcp exists, the signal end PC2 is in low voltage level and the signal end PC0 is in high voltage level. In another word, the voltage level of the signal end PC2 is the inverse voltage level of the signal end PC0. When the native power Vnp exists, PC2=1 and PC0=0; and when only the cable power Vcp exists, PC2=0 and PC0=1. Therefore, according to the voltage level of the signal PC2 and PC0, the power source can be recognized. For example, assumed that $8V \leq V_{np} < 40V$ and the largest voltage the chip can bear is 3.3V, let R2/(R1+R2)=β and 3.3=β×40, and the input threshold voltage Vt equals to β×8, that is (3.3/40)×8.

By applying the result, the designer can properly design the pads for the chip according to the desired input threshold voltage Vt and choose the resistors' values, to meet the requirement of the voltage bearing. Thus, the complexity of the circuit for recognizing power sources can be reduced according to the disclosure of this invention.

From another viewpoint, if the power source used by the hardware device is not the native power Vnp, according to the electric-circuit structure in FIG. 3, the signal end PC0 of the controller is in a high voltage level, and the signal end PC2 is in a low voltage level. Therefore, it is known that the present power source of the hardware device is the cable power according to the above-mentioned voltage levels of the signal end PC0 and the signal end PC2.

Furthermore, the electric circuit for recognizing power sources according to this invention can obtain the magnitude of the native power. It is not like the traditional method, which can only detect whether a native power exists or not. Briefly speaking, if the voltage value of the native power Vnp is between V1~V2, when the native power Vnp exists, the voltage value of the signal end PC0 should be between $V1 \times R2/(R1+R2)$ and $V2 \times R2/(R1+R2)$. Similarly, the voltage value of the signal end PC2 should be between $V1 \times R4/(R3+R4)$ and $V2 \times R4/(R3+R4)$. Therefore, the value of native power Vnp can be exactly induced according to the voltage values of the signal end PC0 or the signal end PC2.

Moreover, because the voltage-dividing device only comprises several resistors, it can be easily installed inside or outside the controller to reduce the manufacturing cost of the whole system.

Effect of the invention:

The above embodiment reveals that the invention, a device for recognizing power sources, has at least the following advantages:

(1) The device for recognizing power sources can be installed in a controller to reduce the usage dimension of an electric circuit board.

(2) The value of a native power can be exactly obtained to simplify the complexity of power management according to the status of signal ends of the controller.

While the invention has been described by way of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A device for recognizing a power source for a chip, wherein said power source can be a native power or a cable power, wherein the native power ranges from a voltage V1 a voltage V2 with V1>V2, and the chip can tolerate a maximum input voltage Vm and has a threshold voltage Vt, the device for recognizing the power source comprising:

a first voltage-dividing device coupled to the native power for providing a first partial voltage, wherein said first voltage-dividing device comprises a plurality of resistors determined by a ratio of the maximum input voltage Vm to the voltage V1; and a second voltage-dividing device coupled to the native power for providing a second partial voltage to a second pad of the chip, wherein said second voltage-dividing device comprises a plurality of resistors determined by the ratio of the maximum input voltage Vm to the voltage V1;

wherein said first voltage-dividing device is coupled to a first pad on said chip and said first pad is designed in response to the voltage V2 and said ratio, so the device for recognizing the power source can recognize the power source according to the first partial voltage.

2. The device for recognizing the power source according to claim 1, wherein said device for recognizing the power source is coupled to the cable power via a diode.

3. The device for recognizing the power source according to claim 1, wherein the chip recognizes the power source as the native power in response to a logic high state of the first partial voltage.

4. The device for recognizing the power source according to claim 3, wherein the chip recognizes the power source as the cable power in response to a logic low state of the first partial voltage.

5. The device for recognizing the power source according to claim 1, wherein the first voltage-dividing device comprises:

a first resistor with one end of the first resistor coupled to the cable power and the other end of the first resistor coupled to the first pad; and a second resistor with one end of the second resistor coupled to the first signal end and the other end of the second resistor connected to ground.

6. The device for recognizing the power source according to claim 5, wherein a ratio of said second resistor to a total resistance of said first resistor and said second resistor is substantial equal to said ratio of the maximum input voltage Vm to the voltage V1.

7. The device for recognizing a power source according to claim 1, wherein the first power is between 8V and 40V.

8. The device for recognizing a power source according to claim 1, wherein the chip is a USB controller.

9. The device for recognizing a power source according to claim 1, wherein the chip is a IEEE-1394 controller.

10. A device for recognizing a power source for a chip, wherein the power source can be a native power or a cable power, wherein the native power ranges from a voltage V1 a voltage V2 with V1>V2, and the chip can tolerate a maximum input voltage Vm and has a threshold voltage Vt, said chip has a first signal end and a second signal end, the device for recognizing the power source comprising:

a diode with a positive end and a negative end, wherein said positive end is used for being coupled to the native power and said negative end is used for being coupled to the cable power;

a first resistor, one end of the first resistor coupled to said positive end of the diode, and the other end of the first resistor coupled to the first signal end;

a second resistor, one end of the second resistor coupled to the first signal end, and the other end of the second resistor connected to ground;

a third resistor, one end of the third resistor being coupled to said positive end of the diode, and the other end of the third resistor coupled to the second signal end; and a fourth resistor, one end of the fourth resistor coupled with the second signal end, and the other end of the fourth resistor connected to ground;

wherein said resistors are determined by a ratio of the maximum input voltage Vm to the voltage V1 and the chip recognizes the power source according to the voltage levels of the first signal end and the second signal end.

11. The device for recognizing the power source according to claim 10, wherein the cable power is between 8V and 40V.

12. The device for recognizing the power source according to claim 10, wherein the chip is a USB controller.

13. The device for recognizing a power source according to claim 10, wherein the chip is a IEEE-1394 controller.

14. The device for recognizing a power source according to claim 10, wherein a ratio of the first resistor to the second resistor is substantial to a ratio of the third resistor to the fourth resistor.

15. The device for recognizing a power source according to claim 10, wherein a pad corresponding to the first signal end and a pad corresponding to the second signal end both have the threshold voltage Vt substantial equal to V2*(Vm V1).

16. A method for recognizing whether a power source used by a hardware device is a native power of the hardware device, wherein the hardware device has a chip, the power source for the chip ranges from a voltage V1 to a voltage V2 with V1>V2, and the chip eaR-tolerates a maximum input voltage Vm, the method comprising:

provbuilding a first partial voltage outputted from a first voltage divider having a plurality of resistors determined by a ratio R of the maximum input voltage Vm to the voltage V1, wherein the first voltage divider is coupled to the power source;

providing a second partial voltage to a second pad of the chip, wherein the second partial voltage is outputted from a second voltage divider having a plurality of resistors determined by the ratio R of the maximum input voltage Vm to the voltage V1, and the second voltage divider is coupled to the power source;

feeding the first partial voltage to a first pad of the chip, wherein the first pad is designed to have a threshold voltage Vt in response to the ratio R and the voltage V2; and determining whether the power source is the native power according to the first partial voltage.

17. The method according to claim 16, wherein the power source is between 8V and 40V.

18. The method according to claim 16, wherein the threshold voltage Vt is substantial equal to (V2*R).

* * * * *